US005369884A

United States Patent [19]

Chen

[11] Patent Number: 5,369,884

[45] Date of Patent: Dec. 6, 1994

[54] INSERTLESS PERFORATED MILL ROLL

[76] Inventor: Irving C. Chen, 12A Hong Kong Garden, 8 Seymour Road, Hong Kong, Hong Kong

[21] Appl. No.: 994,917

[22] Filed: Dec. 22, 1992

[51] Int. Cl.[5] .............................................. B23P 15/00

[52] U.S. Cl. ................................ 29/895.32; 29/895.3; 241/293; 492/46

[58] Field of Search ............. 29/895.3, 895.32, 895.21; 492/46; 241/293; 164/111, 112

[56] References Cited

U.S. PATENT DOCUMENTS

| | | | |
|---|---|---|---|
| 1,618,554 | 2/1927 | Schmitt | 29/895.32 |
| 3,969,802 | 7/1976 | Bouvet | 241/293 |
| 4,391,026 | 7/1983 | Carey | 100/121 |
| 4,546,698 | 10/1985 | Bouvet | 100/121 |
| 4,561,156 | 12/1985 | Sun | 100/121 |
| 4,566,165 | 1/1986 | Georget | 29/895.3 |
| 4,726,417 | 2/1988 | Sano | 29/895.32 |
| 4,765,550 | 8/1988 | Chen | 241/293 |
| 4,779,871 | 10/1988 | Takasaki | 241/293 |
| 4,989,305 | 2/1991 | Pole et al. . | |
| 5,114,521 | 5/1992 | Isegawa et al. | 29/895.32 |

FOREIGN PATENT DOCUMENTS

| | | | |
|---|---|---|---|
| 556846 | 5/1984 | Australia . | |
| 0017132 | 5/1976 | Japan | 29/895.32 |

*Primary Examiner*—Irene Cuda

*Attorney, Agent, or Firm*—W. Wayne Liauh

[57] ABSTRACT

An insertless perforated mill roll body adapted to be detachably sleeved upon a roller shaft for the grinding of a fluid-containing material such as sugar cane and extracting fluid such as sucrose juice therefrom. The insertless perforated mill roll body includes a plurality of shish-ke-bab-like fluid channel strings to be encased in the roll body, each fluid channel string including a hollow fluid channel preferably defined by a channel wall member which generally extends between the two axial ends of the roll body with a plurality of fluid passage members affixed thereto. The roll body is formed by casting a castable material such as cast iron or steel to enclose the fluid channel strings, whereupon a hollow center bore is provided to receive the shaft therethrough. Each fluid passage member contains at least one generally radially extending fluid passage to allow communication between the outer periphery of the mill roll body and the fluid channel. The fluid passages are inherently cast in the roll body without the need to use externally applied inserts and the fluid passage members can be fixedly secured within the roll body by a retaining force developed during the casting process without any external means thus eliminating the insert fall-off problems experienced in the prior art perforated mill rolls while preserving and enhancing all the advantages thereof.

45 Claims, 7 Drawing Sheets

INSERTLESS PERFORATED MILL ROLL

FIELD OF INVENTION

The present invention relates to mill rolls, and the method of manufacture therefor, for the grinding of a fluid containing-material and the extraction of fluid therefrom. More particularly, this invention relates to perforated mill rolls for the grinding of sugar cane and the extraction of sucrose juice therefrom.

BACKGROUND OF THE INVENTION

Sugar making is one of the oldest industries in human history. One of the most important steps in the sugar making process is cane milling, which involves the grinding of sugar cane under pressure between counter-rotating rollers to extract the sucrose juice. A concise review of the cane milling technology is described in *Cane Sugar Handbook*, James C. P. Chen, 11th ed., John Wiley & Sons (1984). The materials contained therein are incorporated herein by reference. As taught by *Cane Sugar Handbook*, the most common milling units generally comprise three cylindrical mill rollers arranged in triangular form, although milling units with two to five or more rollers are also used. Usually three to seven sets of such mill units are used to form a milling tandem.

A mill roller typically comprises a cylindrical roll body tightly shrink-fitted upon a central shaft. In general, most mill roll bodies have V-shaped circumferential grooving on the periphery to increase the grinding area per unit length. The size of the grooving generally decreases from the first mill roller to the last mill roller and can range from four to six grooves to the inch to one inch per pitch or larger. Typically a three roller unit comprises a "top roller" (or "top roll") and two "bottom rollers" (or "bottom rolls") arranged in a triangular relationship. The two bottom rollers comprise a "feed roll" or "cane roll" at the upstream end for receiving the shredded cane, and a "discharge roll" or "bagasse roll" at the downstream end for exiting the crushed bagasse.

During the milling process the prepared cane is first fed into the opening between the top and the feed rolls. Then the bagasse, along with some expressed juice, is guided from the opening between the top and the feed rolls to that between the top and the discharge rolls over a curved plate positioned between the feed and discharge rolls below the top roller, frequently called a turn plate. The expressed juice is collected in a juice tray underneath the bottom rollers.

Due to continuous corrosion by the acidic sucrose juice and the heavy abrasion by the tremendous tonnage of cane that is processed under great pressure each day, all roll bodies inevitably experience noticeable wear as the cane harvesting season progresses. A reduction of the external dimensions by over an inch in one season is not uncommon.

The performance of a mill is often measured by three indications: (1) crushing or milling capacity, (2) sucrose extraction, and (3) bagasse moisture level; all except the bagasse moisture should be as high as possible. Unfortunately, one of the inherent operational difficulties experienced with the conventional rollers is the inadequate drainage of the expressed juice, a problem compounded by the common practice of adding water or thin juice to the bagasse to enhance the extraction, a process called "imbibition". Inadequate drainage can cause flooding at the entrance of the mill with the expressed juice sometimes flowing over the top of the top roller. It can lead to choking of the mill which seriously reduces the mill's crushing capacity. Inadequate drainage also aggravates the re-absorption problem, a phenomenon occurring when trapped juice near the top roll has to percolate its way through the cane blanket to the juice tray and when expressed juice at the pinch gets carried along by the expanding bagasse blanket extruding from the pinch opening. All such problems are detrimental to the performance of a mill.

Some of the drainage problems are ameliorated by using the so-called Messchaert juice grooves, which are essentially radial extensions of the bottoms of the V-grooves formed on the bottom rolls, especially on the feed rolls. The purpose of the Messchaert juice grooves is to provide outlets for the downward draining of the expressed juice. They are therefore of little or no benefit to the top rolls.

To further improve the drainage efficiency of a mill, a series of perforated rolls has been developed. U.S. Pat. No. 3,969,802 (hereinafter, "the '802 patent") discloses a perforated top roll which comprises a steel body with a plurality of peripheral grooves. A plurality of axially extending juice channels are provided within the roll body. Juice passages connecting the outer periphery and the juice channels are formed by first machining out a plurality of female threaded holes on the roll body surface. Then a plurality of male threaded plugs, or inserts, each containing a round radial perforation, are screwed into the female threaded holes. With continuous rotation of the roller and corrosion by the acidic sucrose juice, the threaded connection can become loose and eventually these inserts or plugs may fall out of the roll body, causing serious processing difficulties and equipment damage.

U.S. Pat. No. 4,391,026 ("the '026 patent") was intended to be an improvement over the '802 patent. It discloses a mill roll which similarly includes a roll body, a plurality of peripheral grooves, and a plurality of channels extending axially through the roll body at positions inwardly of the grooves. Perforations between the grooves and the channels are provided by forming within the roll body at the radial bottoms of the grooves a plurality of radial recesses and fitting within such recesses a plurality of inserts, each of such inserts containing a radially extending perforation. These inserts are then welded into the recesses. Such welds are often degraded by the acidity of the sucrose juice and the heavy abrasion and wearing of the roll surface, leading to the same insert fall-off problems and the related maintenance inconvenience.

U.S. Pat. No. 4,561,156 ("the '156 patent") discloses a roller comprising a plurality of roller shell segments, each roller shell segment having a plurality of peripheral grooves and ridges on the outer side and a longitudinal key on the inner side to fit a mounting sleeve. Juice collecting ports are provided within the roller shell segment to provide communication between the outer periphery and internal channels formed between the roller shell segments and the mounting sleeve. The mill roller of the '156 patent contains inserts that are quite different from those stated above; the entire roller shell segments are inserted onto the mounting sleeve by cap screws or other threading means. The entire insert segments can fall off from the roll body and cause more severe problems.

U.S. Pat. No. 4,765,550 ("the '550 patent") discloses a juice extracting mill roll provided with a plurality of juice channels connected with a plurality of juice inlet passages which extend to the periphery of the mill roller. The '550 patent distinguishes from the '802 and '026 patents in that the juice inlet passages have a longer dimension in an axial direction and a shorter dimension in a circumferential direction. The main object of the '550 patent is to reduce the risk of clogging of the juice inlet passages by bagasse and of the flow back of expressed juice from the juice channels to the periphery.

Other perforated mill rolls are disclosed, for example, in U.S. Pat. Nos. 4,546,698 and 4,989,305 and Australian Patent No. 556,846, all of which involving inserts that are fitted into recesses in the roll body from its outer periphery. These inserts are needed in order to provide radially inwardly diverging juice passages between the periphery of the roll body and the axial juice channels designed to facilitate flushing of trapped bagasse. However, none of these prior art patents addresses the issue of fall-off problems associated with such inserts. Because the inserts are fitted radially inward from the outer periphery of the roll body, the dimensions of the recesses are such that their cross-sectional areas cannot increase in the radially inward direction, and no structural means is available to keep the inserts in the recess.

Welding means provides a stronger securing force than threading means for holding the inserts in the mill roll. However, welds can be degraded by the corrosion of the acidic sucrose juice and externally applied welds are always at risk of being completely removed by the abrasion and wearing of the roll surface. Moreover, because cast iron objects are not as easily and readily weldable into other objects as steel, both the inserts and the roll body often have to be made of cast steel, even though it is well known in the art that cast steel has inferior resistance to corrosion and abrasion compared to cast iron.

SUMMARY OF THE INVENTION

The primary object of the current invention is to provide an insertless perforated mill roll which contains cast-in radial perforations, thereby eliminating the mechanical and chemical problems experienced in the prior art perforated mill rolls while preserving and enhancing all their advantages, such as increasing a mill's crushing capacity and fluid extraction and decreasing the fluid content in the crushed material. More particularly, the primary object of the current invention is to provide an insertless perforated mill roll which eliminates the insert loosening and fall-off problems which are the major drawbacks of the prior art perforated mill rolls.

Another object of the current invention is to provide an insertless perforated mill roll body which does not involve externally applied means such as welding, threading or force-fitting from the outer periphery of the roll body to effectuate the radial perforations.

Yet another object of the present invention is to provide an insertless perforated mill roll which can improve drainage of the expressed fluid, minimize reabsorption, and eliminate the problems of flooding, choking and slipping experienced with conventional mill rollers without significantly increasing the operating cost and/or maintenance requirements.

Yet a further object of the present invention is to develop a method for manufacturing insertless perforated mill roll bodies that allows wide flexibility in design as well as selection of construction materials.

For clarity, a "mill" means a complete milling unit, which typically consists of three rollers, as described hereinabove. A "mill roller" comprises a roll body or shell sleeved upon a roller shaft. However, it is to be understood that the terms mill roll, mill roller, roller shell and roll body are frequently used interchangeably in the prior art publications. For a perforated mill roll, the generally radially extending fluid "perforations" or "passages" and the generally axially extending hollow fluid "channels" are formed within the roll body. These void spaces are the most essential elements of a perforated roll relative to a conventional non-perforated roll.

All the prior art perforated mill roll bodies always start with the construction of a conventional. i.e., non-perforated, roll body. Thereafter, surface perforations are obtained by machining off or drilling out a portion of the surface of the roller to form a plurality of recesses which can accept inserts containing such perforated passages. The inserts are subsequently affixed to the roll body by either threading, welding, press-fitting, force-fitting, shrink-fitting, or other externally applied means.

In the present invention, on the contrary, the manufacturing of the perforated roll body begins with the construction of a plurality of shish-ke-bab-like fluid channel strings. In a preferred embodiment, each fluid channel string comprises a fluid channel wall member having a plurality of fluid passage members fixedly attached thereon. The final roll body is then formed by casting a castable material around the plurality of shish-ke-bab-like fluid channel strings arranged generally circumferentially inside a mold.

In the preferred embodiment, the fluid channel wall members are hollow elongated bodies with a plurality of apertures formed at selected positions corresponding substantially to the surface perforations in the final perforated roll body. They can be conveniently constructed from commercially available iron, steel, stainless steel, fiberglass or plastic tubes or pipes. However, they can also be fabricated or assembled from plate materials, from castings, extrusions, or from materials produced by other suitable means or combination thereof, to attain any desired configuration or cross-sectional shape.

The fluid passage member is a three-dimensional object containing at least one fluid perforation. Typically, it is defined by a top surface, a bottom surface, and side surfaces therebetween, the top surface being the surface closest to the periphery of the roll body in the completed construction. It is preferable that the fluid passage member be formed to have a generally greater cross-sectional area towards the bottom and a narrower or smaller cross-sectional area towards the top. This geometrical configuration effectively turns the fluid passage member into an anchoring structure inside the roll body. While the bonding developed during the casting process should hold the fluid passage member firmly within the roll body, the anchoring structure simply provides the additional assurance that the fluid passage member will never fall off from the roll body during operation. Consequently, the life of the roller can be prolonged with little additional maintenance. It should be noted that such an anchoring structure can be obtained by any geometric shape or configuration that allows at least a portion of the circumferential surface of the fluid passage member to be buried radially inwardly of the roll body casting. Such an anchoring support is particularly important when the fluid passage member is made of a different material than the roll body casting.

The fluid perforations in the fluid passage members provide the eventual fluid passages between the outer periphery of the mill roll and the fluid channels, which are generally axially extending. As the fluid passages extend generally radially in the final mill roll, they are conveniently described as "radial fluid passages".

Because the fluid passage members containing the radial fluid passages are constructed prior to the formation of the mill roll body, great convenience and flexibility are possible with respect to the design of the final product. The radial fluid passage can be formed either during the fabrication, assembly, or casting of the fluid passage member or subsequent thereto by drilling or any other suitable means. It can be an open hole penetrating the entire depth of a fluid passage member, extending from its top surface to its bottom surface. It can also be in the form of a recess initially, penetrating only through the bottom surface, with the top perforation subsequently obtained by machining off the top portion of the fluid passage member after the final mill roll body is constructed.

To form the plurality of fluid channel strings, the fluid passage members are fixedly attached onto the fluid channel wall members in such a manner that each radial fluid passage is in communication with at least one fluid channel through a connecting aperture. Alternatively, each fluid channel string can be made by casting a castable material around a channel shaped core material made of epoxy resin, sand, clay or other suitable material with a plurality of fluid passage members or cores for the radial fluid passages attached or formed thereon. The core material can be removed after the casting is completed to provide the void spaces inside the fluid channel string.

The final perforated roll body is formed by casting a castable material into a casting mold containing a centrally positioned cylindrical core and the fluid channel strings, the latter arranged in a generally circumferential manner inwardly of the periphery of the mold with the fluid passage members directing generally radially outwardly. It can be cast or molded from any castable material including cast iron, cast steel, other metallic, ceramic or even plastic materials. The final roll body from such a casting process contains void spaces constituting the axial fluid channels, the radial fluid passages, and a hollow central bore for receiving the roller shaft. If the fluid passage members already have perforations that run from the top surface to the bottom surface, little or no machining will be required on the fluid passage members to complete the perforations. Otherwise, a portion of the fluid passage member and/or the surface of the mill roll casting must be machined or ground off to expose the radial fluid passage, to provide thereby communications between the outer peripheral surface of the mill roll and the juice channels.

To increase the grinding area per unit length of a mill roll, a plurality of circumferential grooves can be formed on the periphery of the roll body. Though not generally required, chevron grooves may also be formed on the flank surfaces of the circumferential grooves to improve feeding further. Such chevron grooves comprise a plurality of hook grooves, each composed of a forward or leading wall, a rear or trailing wall, and a trough, and are cut substantially perpendicular to the apex of the circumferential grooves. They can be arranged in a chevron shape with respect to the axis of the mill roll or generally axially along the roll surface at every one, two, or more circumferential grooves. All surface grooves can be formed by casting or more preferably by machining off a portion of the roll body surface. They may be formed as a part of the perforated mill roll body or after the roll is made, at the manufacturing shop or at mill site.

One advantage of the present invention is that it allows a wide selection of materials from which the roll body may be constructed. Generally, it is preferable to have the fluid channel wall members made of steel because of the ready commercial availability of steel pipes. The fluid passage members and the remaining portion of the roll body including the grooves are preferably made of cast iron because of its relatively superior resistance to mechanical abrasion and chemical corrosion. The surface of the roll body may be roughened by arc welding to increase its ability to grab and feed the material to be crushed. This surface roughening is particularly desirable if cast steel is used to form at least the outermost surface of the roll body.

In this disclosure, the word "radial" has a broad meaning which includes any direction from the axis of the roll to any point on its outer periphery, or vice versa. A radial direction can follow a non-straight, curved or tortuous path. Similarly, the word "axial" generally means any direction connecting any two points each selected from one of the two cylindrical ends of the roll body. An axial direction can also follow a non-straight, curved, tortuous, twisted, or spiral path.

The perforated mill roll will be most effective if used as a top roll in the first mill of a milling tandem. However, it can also be used in subsequent mill units or as bottom rolls to improve the tandem's milling performance. One of the advantages of the cast-in insertless perforated mill roll of the present invention is that it can be readily employed as a substitute or routine replacement for any type of spent rollers. When a new roll body is needed, the insertless perforated roll body of this invention can be simply sleeved upon the existing shaft.

DETAILED DESCRIPTION OF THE PREFERRED EMBODIMENT

Figure 1:
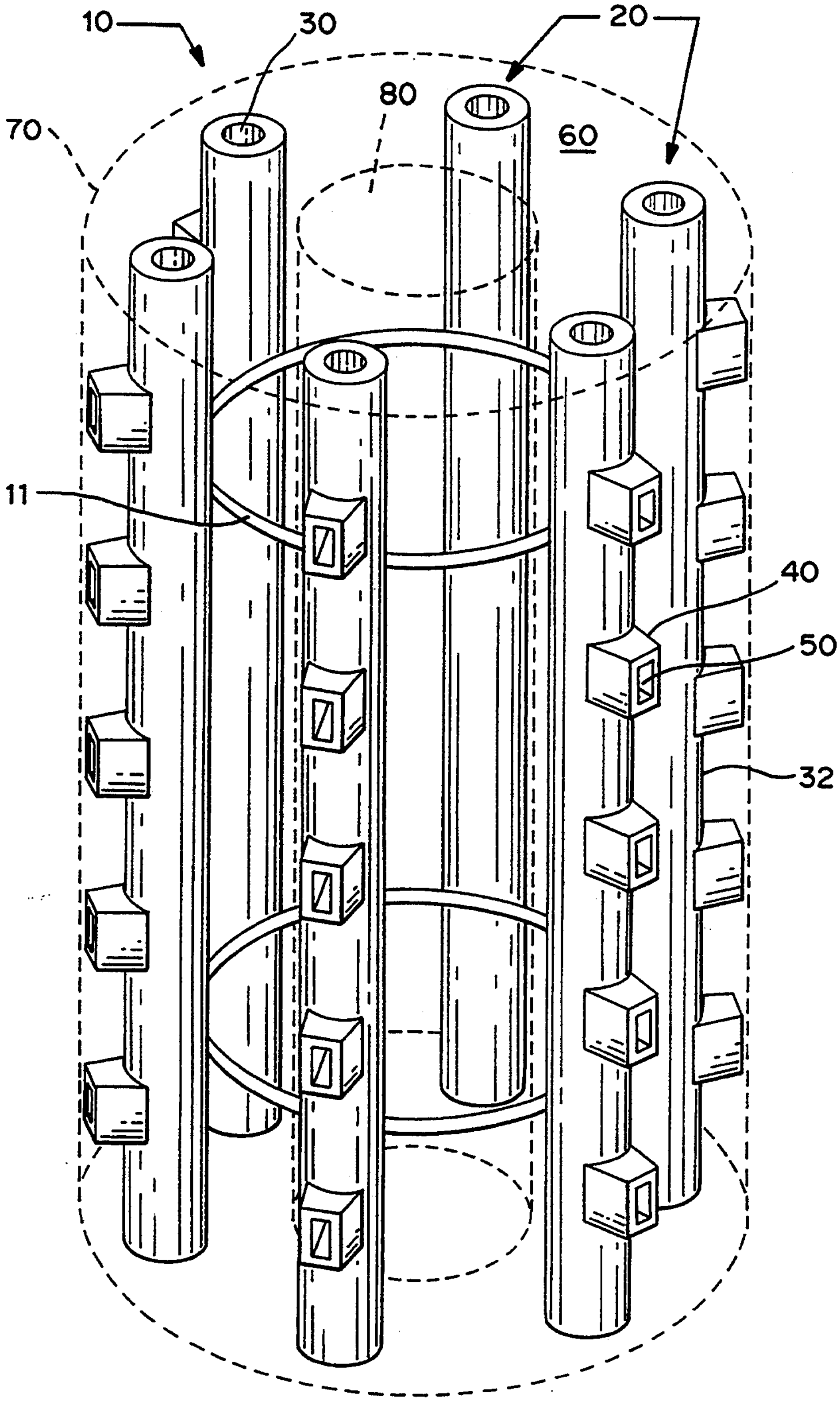
FIG. 1 is a revealed view of the perforated mill roll body of the present invention showing a plurality of circumferentially aligned fluid channel strings encased in the roll body.

Now referring to the drawings. In FIG. 1 it is illustrated a revealed view of the insertless perforated mill roll body 10 according to a preferred embodiment of the present invention. The mill roll body contains a plurality of shish-ke-bab-like fluid channel strings 20, each containing an axially elongated fluid channel 30, defined by a fluid channel wall member 32, and a plurality of fluid passage members 40. Each fluid passage member 40 contains therethrough a radial fluid passage 50. The roll body casting 60, which forms the rest of the roll body, is formed by casting a castable material around the shish-ke-bab-like fluid channel strings 20. The fluid passages 50 are therefore inherently cast in the roll body without the need of using externally applied inserts. A bonding force between the fluid passage members 40 and the roll body casting 60 is developed when the castable material solidifies. Such a bonding force is often adequate to fixedly secure the fluid passage members 40 within the roll body 10; however, other inherent means, which are described below, can be utilized to further secure the fluid passage members 40, or as an alternative securing means. Circumferential rings 11 are used to hold the fluid channel strings in place before and during the casting process. FIG. 1 also shows a hollow central bore 80 which is provided to allow the mill roll body to be sleeved upon a cylindrical roller shaft, not shown here, for ultimate installation as a mill roller in a cane milling unit. Circumferential grooves, which will be shown in subsequent figures, may be formed on the outer periphery 70 to increase grinding area per unit length of the roll body.

Figure 4:
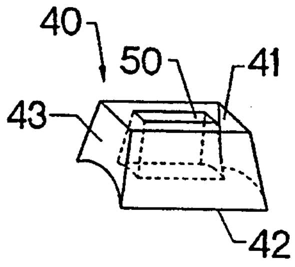
FIG. 4 is a perspective view of the fluid passage member.
Figure 2:
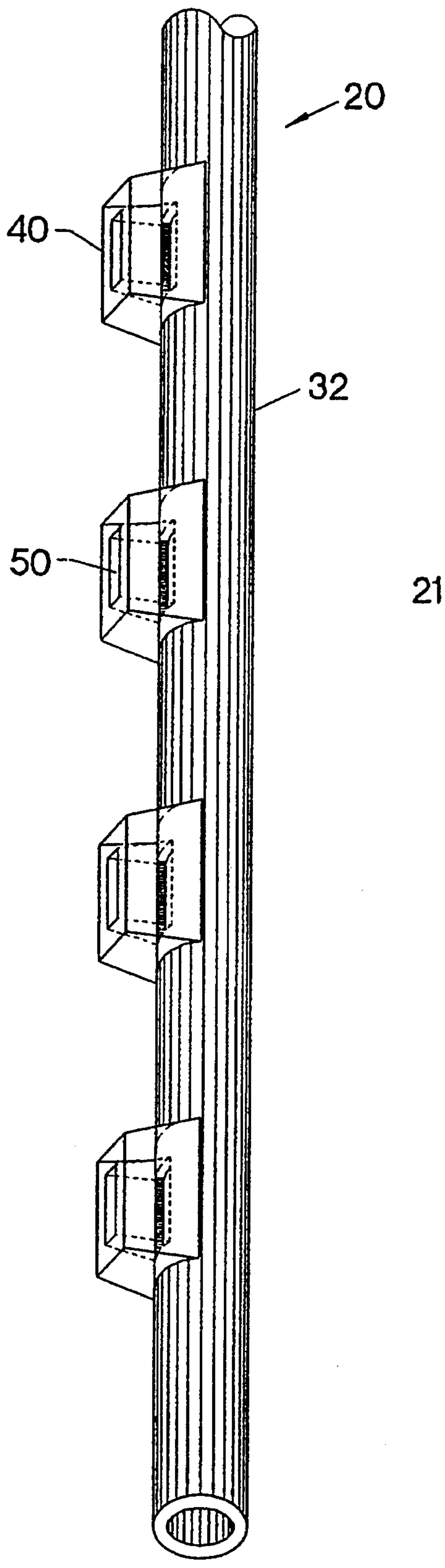
FIG. 2 is a perspective view of the shish-ke-bab-like fluid channel string.
Figure 3:
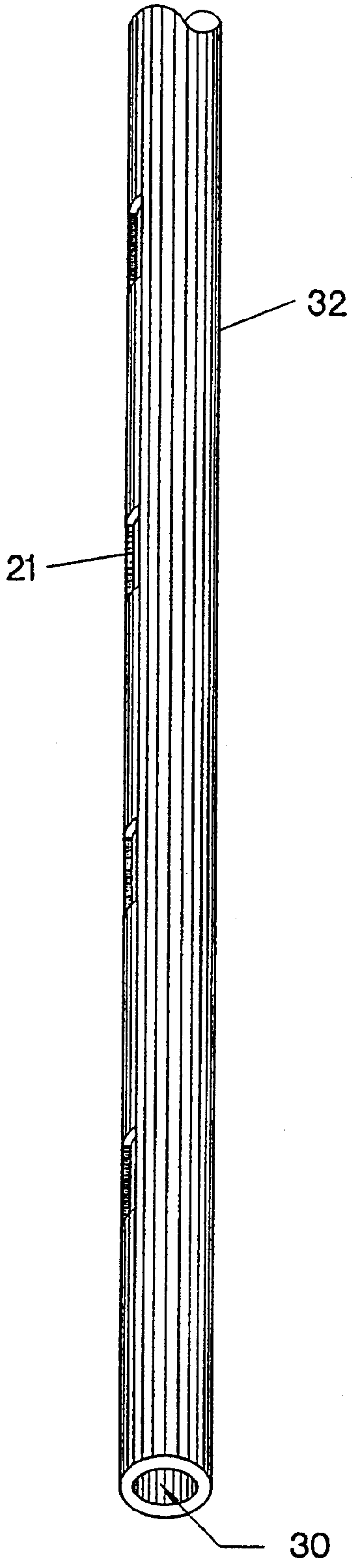
FIG. 3 is a perspective view of the fluid channel wall member having apertures formed thereon.

FIG. 2 shows a perspective view of a preferred embodiment of the fluid channel string 20 of the present invention, while perspective views of the fluid channel wall member and fluid passage member are shown, respectively, in FIGS. 3 and 4. Each fluid channel wall member 32 has a plurality of apertures 21. These apertures are properly disposed so as to correspond substantially to locations of the perforations to be formed on the outer periphery of the final mill roll body 10.

In FIG. 1, as well as in subsequent figures, the axial fluid channel 30 is illustrated to be defined by a fluid channel wall member 32. This is a preferred embodiment; however, fluid channels can be cast in the roll body using sand, resin, clay or other filler or core material. Since the fluid channels often have a large length/diameter ratio, if the latter option is desired, it may be preferred to use a stronger and non-decomposable core material such as a metallic core material with an anti-adhesion coating applied thereon to facilitate removal of the core upon completion of the casting. The shish-ke-bab-like fluid channel string can also be cast as a single unit.

While each fluid channel wall member 32 is shown to have a uniform circular cross-section throughout the length of the channel, it can be of other different cross-sectional shapes, for example, elliptical, rectangular, trapezoidal, and/or truncated sector shaped. The trapezoidal or truncated sector shape is preferred if high flow rate is expected, each diverging towards the periphery of the roll body. Furthermore, it may be preferred that the cross-section of the fluid channel diverges from around its center to both ends. The fluid channel may also be angled or bowed from around its center point towards the outer periphery of the roll body (i.e., concave from the central axis) to improve the exit of extracted juice. It can further be curved, spiraled or twisted, if doing so should improve fluid flow therethrough. A long fluid channel wall member can be obtained by axially connecting a plurality of relatively shorter wall members together through threading, welding, sleeving or other coupling means.

The fluid passage member 40 is a three dimensional object. In the preferred embodiment as shown in FIG. 4, it has a top surface 41, a bottom surface 42, and side surfaces 43 connecting the top surface and the bottom surface. In the final roll body, the top surface 41 is the radially outermost surface, and the bottom surface 42 is the radially innermost surface. It can be formed to have any shape such as cylindrical, truncated sector shaped, conical, pyramidal, spherical, or any combination thereof. The fluid passage members 40 are fixedly secured in the roll body by an adhesion force which generally develops during the casting process when the castable material is brought in contact with the outer surface of the fluid passage member 40 and solidifies. It is preferred that a portion of the fluid passage member 40 be provided with a greater cross-sectional area than its adjoining radially outer portion. By having a larger cross-sectional area at its radially inner or innermost portion, the fluid passage member 40 is provided with an anchoring means in the final mill roll body 10 after the casting is formed. The fluid passage member 40 can also be made of a wide variety, of materials such as cast iron, cast steel, stainless steel, ceramic material, high strength plastics or any other suitable materials. Since cast iron is known to have better resistance to wearing and corrosion than cast steel, it is preferred that the fluid passage members be made of cast iron.

The radial fluid passage 50 provides communication between the outer periphery 70 of the roll body and the axially extending fluid channel 30. Only one radial fluid passage 50 is shown in each fluid passage member in FIG. 4, but more may be provided therein. It can be furnished when the fluid passage member 40 is formed during the casting process using a decomposable core material. However, like the forming of the fluid channel, it can also be formed with a non-decomposable or reusable core such as a metallic core. It can also be formed by casting the fluid passage member around a fluid passage wall member, not shown, or in multiple stages to attain its required configuration. The purpose of using a multiple-stage casting process is to reduce the effect of thermal stress that may be exerted on the fluid passage wall member. Alternatively, the radial fluid passage can be provided after the fluid passage member is formed by drilling, milling, cutting, gouging, etching, punching or any other suitable means. It can also be formed by constructing and piecing together the fluid passage member in two or more segments.

In the preferred embodiment as shown in FIG. 4, the radial fluid passage 50 is shown as an open channel. It may also be formed initially as a radial recess, with an opening through the bottom surface 42 of the fluid passage member 40 only. Surface perforations can be obtained and the radial fluid passage 50 exposed after the roll body 10 is formed by machining off a portion of the outer periphery 70 of the roll body and/or a portion of the fluid passage member 40.

In the preferred embodiment shown in the figures, the radial fluid passage is shown to be an elongated rectangular passageway with a longer axial width and a shorter circumferential width. Such an orientation is preferred because the larger width in the axial direction increases radial fluid flux; whereas the smaller width in the circumferential direction, being the feeding direction of the material to be crushed, minimizes the risk of clogging. The radial fluid passage can also be formed as a similarly elongated passageway but with a longer width in the circumferential direction. Furthermore, the radial fluid passage can be made to have a round cross-section. It is also possible to have an assortment of radial fluid passages of various shapes and orientations formed in the same roll body. Since the fluid passage member of this invention can be formed by combining more than one segment, this greatly facilitates the process to make fluid passages of various shapes. To further minimize the clogging problem, the interior surface of the radial fluid passage can be sleeved, inlaid, or coated with a layer of low friction material such as teflon, chrome-plating or glass-lining. If the radial fluid passage includes a separate fluid passage wall member, it can likewise be made of low friction material such as teflon, glass, or polished stone. The fluid passage wall member can also be made from different materials with high resistance to corrosion and abrasion such as stainless steel.

In the preferred embodiment as shown in FIG. 2, the fluid channel string 20 is formed by first forming the fluid channel wall member 32, then fixedly attaching the fluid passage members 40 containing radial fluid passages 50 onto the fluid channel wall member 32, the radial fluid passages 50 substantially matching the apertures 21 on the fluid channel wall member 32.

In all the figures discussed heretofore, the fluid passage members are shown to have curved bottom surfaces substantially matching the curvature of the fluid channel wall member. However, such a curved bottom surface is not the only adoptable shape as the configuration of the seat for the fluid passage member on the fluid channel wall member may vary, at least in part according to the shape of the fluid channel wall member used.

Figure 7A:
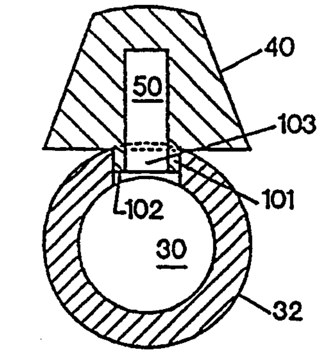
FIGS. 7A and 7B show a radial and an axial cross-sectional view, respectively, of an embodiment showing a collar-extension-type affixing means for affixing a fluid passage member with a fluid channel wall member.
Figure 7B:
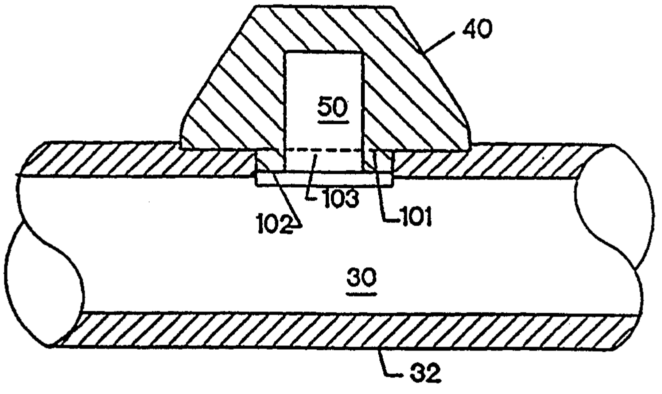

FIGS. 7A–B and 8A–B show two embodiments of the present invention which utilize an extension-recess affixing means to affix the fluid passage members to the fluid channel wall member. In FIGS. 7A and 7B, which show a radial and an axial cross-sectional view respectively of one of the embodiments, a collar extension 101 is provided as an extension of the bottom surface of the fluid passage member 40. The collar extension 101 defines a relatively shorter passage 103 extending from the fluid passage 50. A recess 102 of appropriate dimension is provided around the aperture of the fluid channel wall member 32. The recess 102 is so dimensioned that the collar extension can be tightly fitted therein with force. Welding means can be provided around the collar extension and the recess.

Figure 8A:
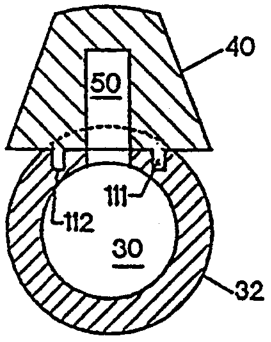
FIGS. 8A and 8B show a radial and an axial cross-sectional view, respectively, of another embodiment showing a leg-extension-type affixing means for affixing a fluid passage member with a fluid channel wall member.
Figure 8B:
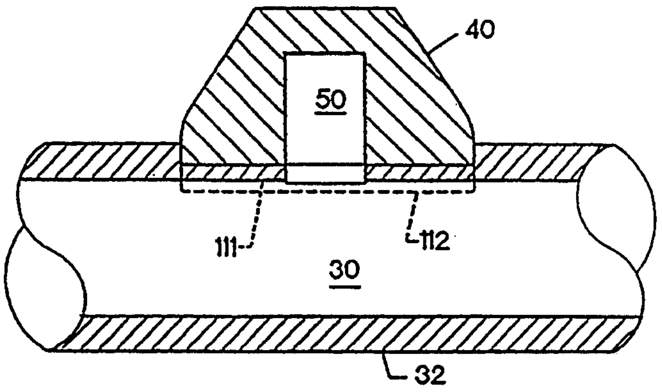

In FIGS. 8A and 8B, which show a radial and an axial cross-sectional view respectively of another embodiment, the fluid passage member is shown to have two leg extensions 111 to be received by two matching grooves 112 provided in the fluid channel wall member 32 through a force-fitting means. These embodiments are preferred when the fluid passage member 40 is made of a material that has a higher thermal expansion coefficient than the fluid channel wall member 32, as disengagement thermally induced during the casting process can be effectively prevented by virtue of their structural configurations.

Figure 9A:
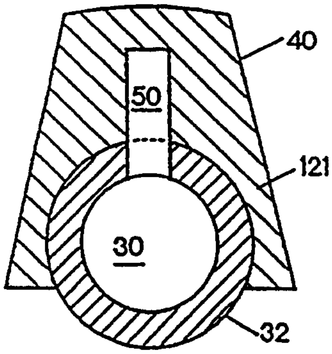
FIGS. 9A and 9B show a radial and an axial cross-sectional view, respectively, of yet another embodiment showing a sleeving-type affixing means for affixing a fluid passage member with a fluid channel wall member.
Figure 9B:
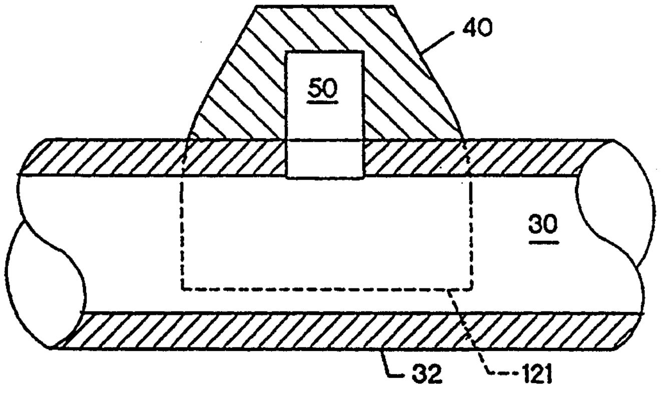

Another embodiment is to provide a sleeving means in the form of two circular leg extensions from the fluid passage member 40, as shown in FIGS. 9A-B. The sleeving means 121 holds the fluid passage member 40 and the fluid channel wall member 32 in place by covering more than half of the circumference of the fluid channel wall member 32 after it is sleeved thereon. Again, welding means can be provided around the leg extensions and the fluid channel wall member. The FIGS. 9A–B embodiment is preferred when the fluid channel wall member 32 is made of a material that has a higher thermal expansion coefficient than the fluid passage member 40.

The locations of the collar extension and its matching recess can be reversed on the fluid passage member and fluid channel wall member, and the sleeving means can be expanded to form a partial or complete ring-like clamp to sleeve upon the fluid channel wall member and the fluid passage member. In addition to press-fitting, force-fitting, shrink-fitting, welding, or sleeving means, other affixing means involving threading, bolting, pinning, wedging, wrapping, gluing or a variety of third elements such as bolts, pins, keys, clips, clamps, rings, wires, or other coupling means can be used to hold the fluid passage member and the fluid channel wall member together. A combination of the various affixing means can also be used.

Figure 5A:
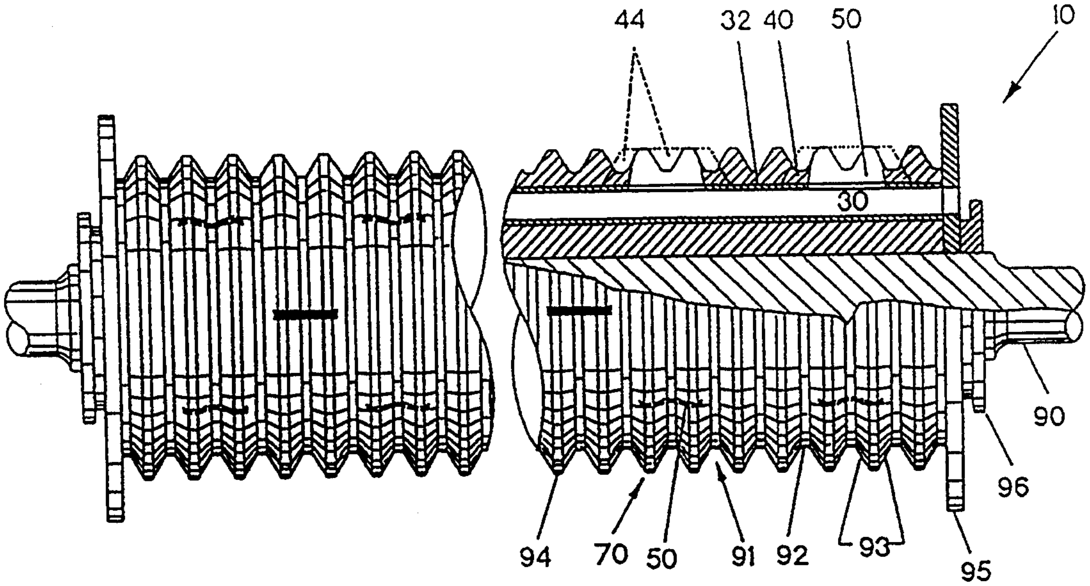
FIGS. 5A and 5B show partial sectional views of two embodiments of the present invention.
Figure 5B:
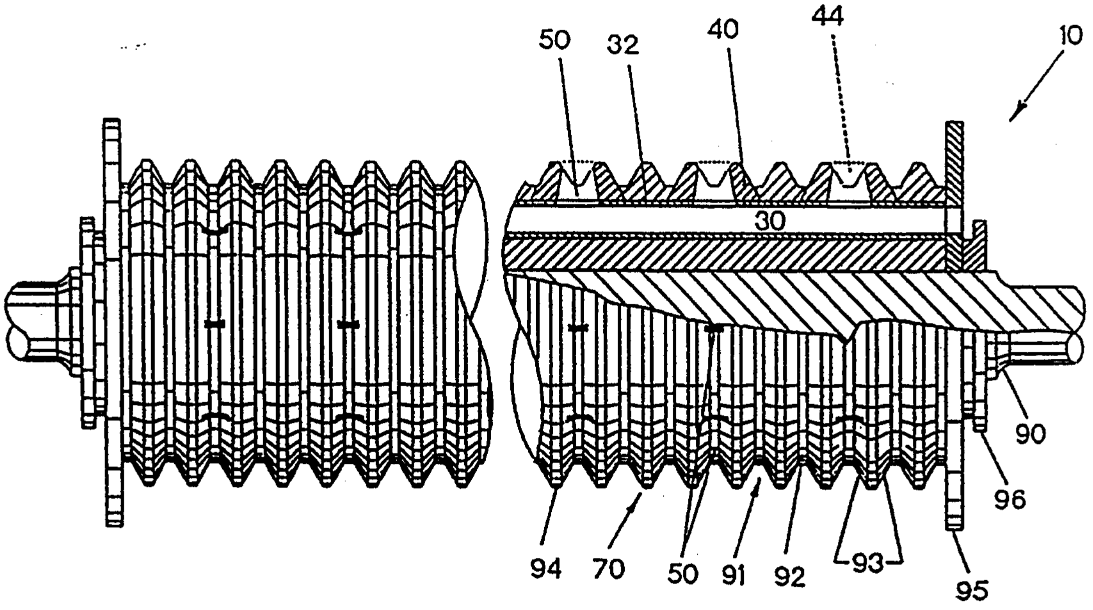

To complete the construction of the insertless perforated mill roll body of the present invention, a castable material is cast around a plurality of the shish-ke-bab-like fluid channel strings 20 circumferentially disposed and supportively secured by a plurality of supporting rings 11 around a central core in a casting mold, as shown in FIG. 1. FIGS. 5A and 5B show partial sectional views of two embodiments of the insertless perforated mill roll body of the present invention so formed. The roll body 10 contains void spaces constituting the radial fluid passages 50 and the axial fluid channels 30 formed therewithin. A hollow central bore 80 (shown in FIG. 1) is provided to allow the roll body to be sleeved upon a cylindrical roller shaft 90. The roll body casting 60 comprises solid material. During fluid extraction, expressed fluid is forced from the outer periphery 70 of the roll body into the radial fluid passage 50 by a compressional force resulting from the grinding action of the mill rollers, and flows out of the axial ends of the roll body 10 through the axial fluid channels 30.

To increase the grinding area per unit length of the roll body, circumferential grooves 91 are formed on the outer periphery 70 of the roll body. Each circumferential groove is defined by a groove bottom surface 92, flank surfaces 93, and a groove top surface 94. The circumferential grooves can be formed, preferably by removing a portion of the outer periphery, by machining, grinding, gouging or other suitable means, or by a casting process, or any combination thereof. Phantom lines 44 show the portion of the fluid passage member that has been machined off to form such surface grooves. The fluid passage members can be formed during the casting process to also contain portions of the circumferential grooves.

Figure 6A:
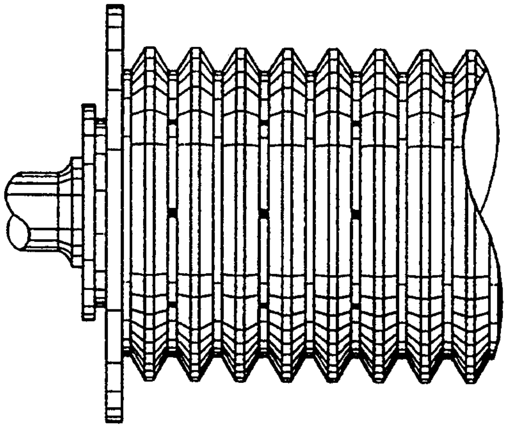
FIGS. 6A–6D show partial perspective views of four other embodiments of the present invention.
Figure 6B:
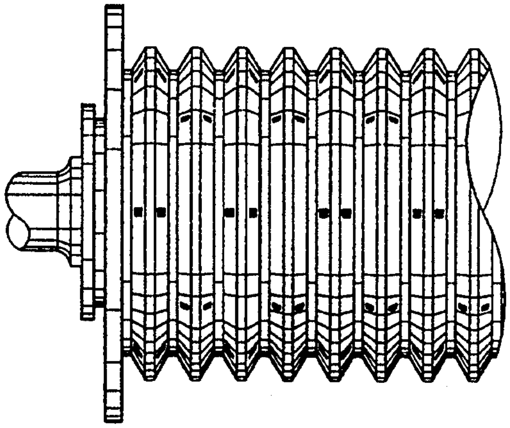
Figure 6C:
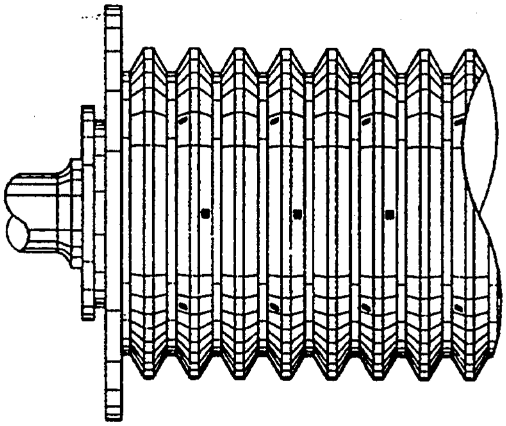
Figure 6D:
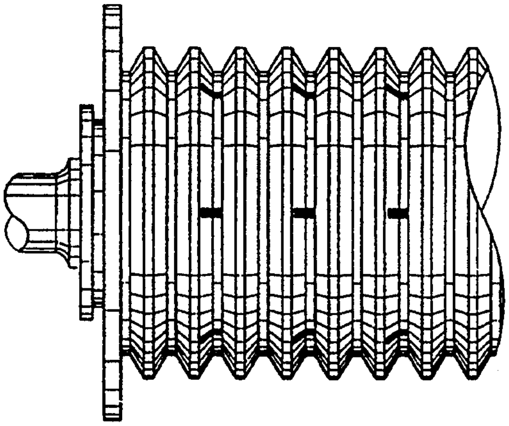

The radial fluid passages can be formed to penetrate through one or more of the groove bottoms 92, one or more of the groove tops 94, or one or more of the flank surfaces 93, or any combination thereof. In FIG. 5A, the fluid passage penetrates one bottom surface, two complete flank surfaces, two top surfaces, and two partial flank surfaces. In FIG. 5B, the fluid passage penetrates one bottom surface and two partial flank surfaces. Other examples are illustrated in FIGS. 6A (one bottom surface), 6B(two partial flank surfaces but no bottom surface), 6C(one partial flank surface), and 6D(one bottom surface and one partial flank surface). One of the advantages of the present invention is the flexibility of design. An essentially infinite number and combination of configurations of the surface openings can be furnished to cater to desired applications. In the preferred embodiment, the openings are substantially aligned either circumferentially or axially. However, the openings can be staggered and/or slanted randomly or in any desired manner.

Figure 10:
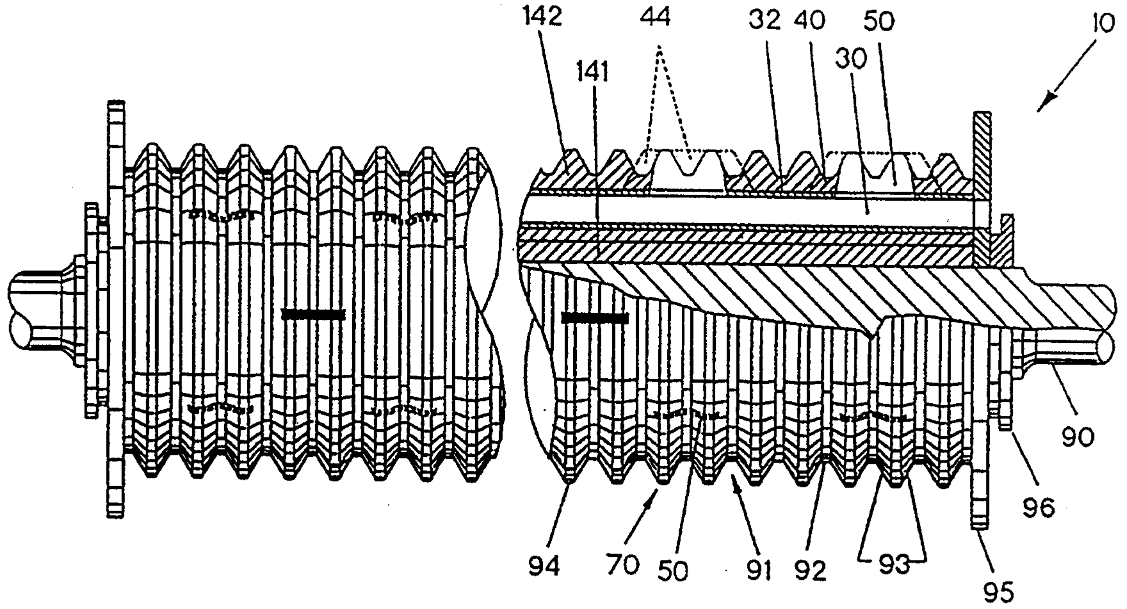
FIG. 10 shows a partial sectional view of yet another embodiment of the present invention containing an intermediary inner shell which is sandwiched between the roll body and the central shaft.
Figure 11:
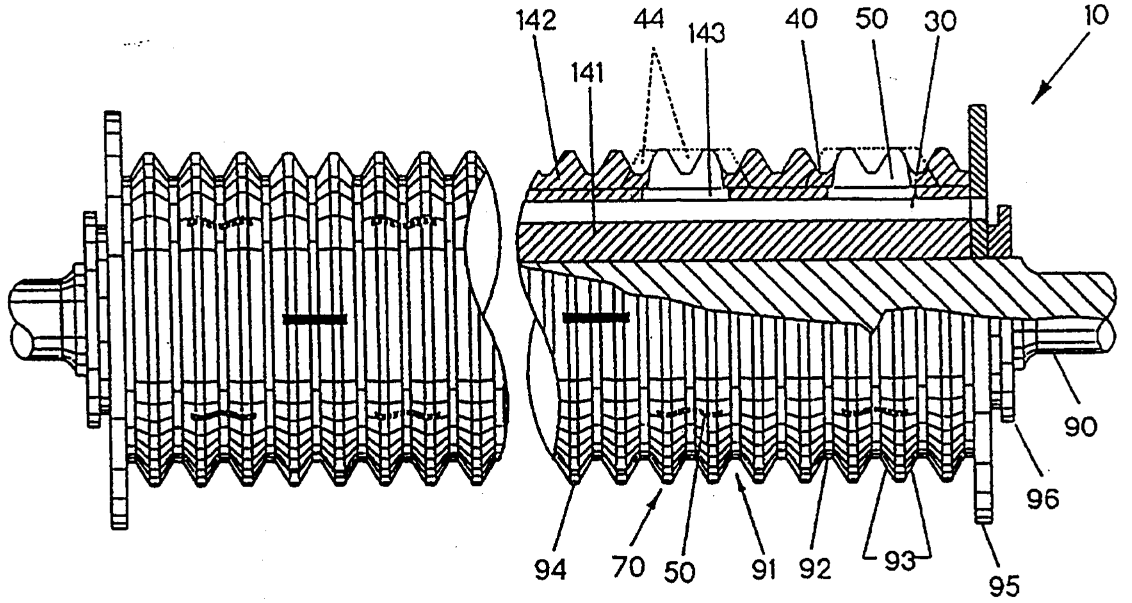
FIG. 11 shows a partial sectional view of yet another embodiment of the present invention containing an inner shell within which the fluid channels arc cast.
Figure 12:
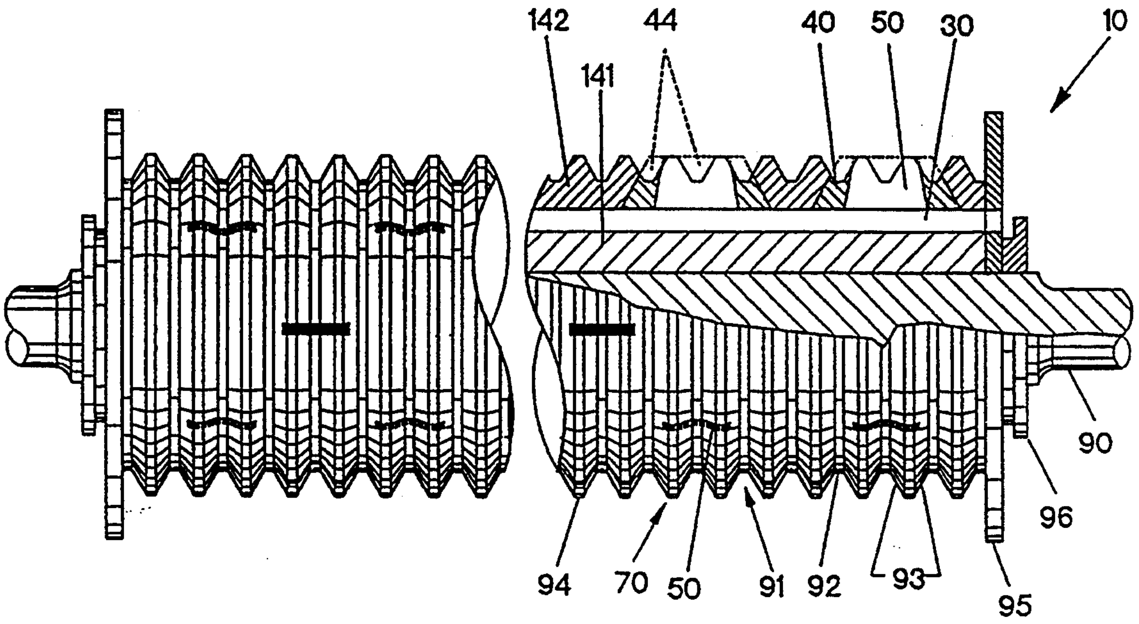
FIG. 12 shows a partial sectional view of yet another embodiment of the present invention in which the fluid channels are defined by a plurality of grooves formed on the outer periphery of an inner shell and the inner periphery of an outer shell.

Although the best mode contemplates the perforated roll body of the present invention to be sleeved upon a shaft, the present invention can be conveniently practised, when desirable, using various inner-and-outer shell configurations. FIG. 10 shows an embodiment of such configuration in which a solid inner shell 141 is sandwiched between the outer roll body casting 142 and the shaft 90. In another embodiment, which is shown in FIG. 11, the roll body casting comprises an inner shell 141 sleeved inside an outer shell 142. The fluid channels 30 are encased entirely in the inner shell 141, wherein radial perforations 143 are provided to allow communications with radial fluid passages 50 in the outer shell 142. The outer shell 142 can be formed by casting a castable material around a plurality of fluid passage members 40 using a procedure similar to that described above. Furthermore, as shown in FIG. 12, the perforated mill roll body can also be made to comprise two tightly sleeved cylindrical shells—an inner shell 141 and an outer shell 142. The fluid channels 30 are formed in part by surface grooves provided on the outer periphery of the inner shell 141 and in part by the inner periphery of the outer shell 142, with each of the radial fluid passages 50 so disposed to communicate with at least one of the aforementioned axial surface grooves when the shells are assembled. Void spaces comprising the fluid channels and the connecting radially extending fluid passages are thus formed inside the roll body when the outer shell is sleeved upon said inner shell. To complete the perforated mill roll body, each radial fluid passage can be made to be exposed at the outer periphery, if not already so, by removing a portion of the outer periphery of the outer shell or a portion of the fluid passage member or both by machining or other suitable means.

The perforated mill rolls of the present invention are generally used as top rolls, which typically contain flanges 95 to keep the material being crushed within bounds and fluid guards 96 to protect the shaft from splashes of fluid draining off from the fluid channel openings at both ends of the roll body. However, as stated earlier, the perforated mill rolls of the present invention can also be used as bottom rolls.

This invention discloses an insertless perforated mill roll body. Although the best mode contemplated for carrying out the present invention has been herein shown and described, it will be apparent that modification and variation may be made without departing from what is regarded to be the subject matter of the invention.

What is claimed is:

1. A method of making an insertless perforated mill body having a generally cylindrical outer periphery and a hollow bore to be sleeved upon a rotatable shaft, said method comprises the steps of:

(a) forming a plurality of fluid channel strings, each said fluid channel string comprising a hollow fluid channel wall member having a fluid channel defined therein and a plurality of fluid passage members affixed thereto, each of said fluid passage members containing at least one generally radially extending fluid passage and each of said channel wall members containing a plurality of apertures to allow communication between said fluid channel and said fluid passage:

(b) forming a roll body casting by casting a castable material around said fluid channel strings with said fluid passage members disposed generally radially outwardly while leaving a central bore for receiving said shaft, said roll body containing void spaces comprising a plurality of said fluid channels and a plurality of said fluid passages, each of said fluid channels having at least one opening at one axial end of said roll body; and (c) removing a portion of said casting or a portion of said fluid passage member or both where said fluid passages are not already exposed on said outer periphery or where necessary to connect said fluid passages to said outer periphery of said roll body.

2. The method of making perforated mill roll body of claim 1 wherein said fluid passage members are fixedly secured in said roll body at least in part by a retaining force developed during said casting process to form said roll body casting.

3. The method of making perforated mill roll body of claim 2 wherein said retaining force comprises an adhesion force between said fluid passage members and said roll body casting which is formed when said castable material solidifies during said casting process.

4. The method of making perforated mill roll body of claim 2 wherein said retaining force comprises a geometrical means provided with said fluid passage member by which at least a portion of the surface of said fluid passage member is buried radially inwardly of said roll body casting to form an anchoring support whereby said fluid passage member is prevented from falling off from said roll body.

5. The method of making perforated mill roll body of claim 4 wherein said fluid passage members have non-uniform radial cross-sections and at least a portion of said radial cross-sections have areas greater than a more radially outward portion to form said anchoring support.

6. The method of making perforated mill roll body of claim 4 wherein each of said fluid passage members is defined by a radially outer surface, a radially inner surface and side surfaces therebetween, and said side surfaces comprise at least a pair of generally opposing surfaces at least a portion of which being radially outwardly converging to form said anchoring support.

7. The method of making perforated mill roll body of claim 1 wherein said fluid passage members are substantially aligned either circumferentially or axially, or both circumferentially and axially.

8. The method of making perforated mill roll body of claim 1 it wherein said fluid passage members are staggered either circumferentially or axially, or both circumferentially and axially.

9. The method of making perforated mill roll body of claim 1 wherein said outer periphery contains a plurality of circumferential grooves to increase said grinding surface.

10. The method of making perforated mill roll body of claim 9 wherein each of said circumferential grooves is defined by a groove bottom surface, a groove top surface, and a pair of flank surfaces, and wherein each of said radially extending fluid passages comprises at least a fluid entrance formed on at least a portion of one of said groove bottom surfaces, a plurality of said groove bottom surfaces, at least a portion of one of said groove top surfaces, a plurality of said groove top surfaces, at least a portion of one of said flank surfaces, a plurality of said flank surfaces, or combination thereof.

11. The method of making perforated mill roll body of claim 1 wherein said fluid passages are generally radially inwardly diverging.

12. The method of making perforated mill roll body of claim 1 wherein at least a portion of said fluid passage has a generally shorter effective spacing in the circumferential direction than in the axial direction.

13. The method of making perforated mill roll body of claim 1 wherein said fluid channels are concaved with respect to said axis of said mill roll body.

14. The method of making perforated mill roll body of claim 1 wherein at least the radially outer portions of said fluid channels are concaved with respect to said axis of said mill roll body.

15. The method of making perforated mill roll body of claim 1 wherein at least a portion of said fluid channel is bent, spiralled, or curved.

16. The method of making perforated mill roll body of claim 1 wherein each of said fluid channels is provided with at least one opening at one of said axial ends.

17. The method of making perforated mill roll body of claim 1 wherein said fluid channels have a generally sector-shaped-axial cross-section which is radially outwardly diverging.

18. The method of making perforated mill roll body of claim 1 wherein said fluid channel has an interior surface which is sleeved, inlaid, or coated with a low friction material.

19. The method of making perforated mill roll body of claim 1 wherein said fluid passage has an interior surface which is sleeved, inlaid, or coated with a low friction material.

20. The method of making perforated mill roll body of claim 1 wherein said fluid channels are formed at least in part by casting a castable material around a core material and removing said core material thereafter.

21. The method of making perforated mill roll body of claim 1 wherein said radially extending fluid passage is formed at least in part by casting a castable material around a core material and removing said core material thereafter.

22. The method of making perforated mill roll body of claim 1 wherein said fluid passage member is formed at least in part by piecing together two or more segmented members.

23. The method of making perforated mill roll body of claim 1 wherein said fluid passage member is formed at least in part by a multiple casting process.

24. The method of making perforated mill roll body of claim 1 wherein each of said fluid channels is defined by a hollow channel wall member having a plurality of apertures formed therethrough, said apertures are disposed so as to substantially match said fluid passages.

25. The method of making perforated mill roll body of claim 24 which further comprises affixing means for fixedly abutting said fluid passage members with said channel wall members such that said fluid passages become communicated ,with said fluid channels through said apertures.

26. The method of making perforated mill roll body of claim 25 wherein at least part of said affixing means comprises an integral casting means whereby said fluid passage members are integrally cast with said channel wall members.

27. The method of making perforated mill roll body of claim 25 wherein at least part of said affixing means comprises an extension in said fluid passage member and a matching recess in said channel wall member, or an extension in said channel wall member and a matching recess in said fluid passage member, said extension and said recess being of such dimensions that said extension can be tightly fastened into said recess by a force-fitting means.

28. The method of making perforated mill roll body of claim 25 wherein at least part of said affixing means comprises a welding means applied between said fluid passage members and said channel wall members.

29. The method of making perforated mill roll body of claim 25 wherein at least part of said affixing means comprises a sleeve means provided with said fluid passage member which is adapted to sleeve upon said channel wall member.

30. The method of making perforated mill roll body of claim 1 wherein at least one of said fluid passage members is initially completely buried radially inwardly of said outer periphery of said roll body and said generally radially extending fluid passage contained therein can be subsequently made to be in communication with said outer periphery by removing a portion of said outer periphery or a portion of said fluid passage member or both.

31. The method of making perforated mill roll body of claim 1 which further comprises at least one intermediary cylindrical shell adapted to be sandwiched between said shaft and said hollow center bore.

32. The method of making perforated mill roll body of claim 1 wherein at least one of said fluid passage members is partially exposed on said outer periphery of said roll body.

33. The method of making perforated mill roll body of claim 1 wherein said roll body casting comprises an outer casting and an inner casting, said outer casting containing a first outer periphery, which is the outer periphery of the entire roll body, and a first inner periphery, and said inner casting containing a second outer periphery and a second inner periphery, wherein:

(a) said inner casting is adapted to be sleeved upon said shaft, said inner casting contains a plurality of said fluid channels which are cast therewithin, said inner casting further contains a plurality of generally radially extending perforations adapted to provide communication between said fluid channels and said second outer periphery;

(b) said outer casting is formed by casting a castable material around a plurality of fluid passage members and is adapted to be sleeved upon said inner casting, each of said fluid passage members contains at least one said generally radially extending fluid passage in communication with said first inner periphery, and said fluid passage members are disposed so as to abut said inner casting at said radially extending perforations when said outer casting is sleeved upon said inner casting, thereby providing communication between said fluid passages and said fluid channels; and (c) said outer casting further contains a plurality of fluid entrances on said first outer periphery thereof in communication with said fluid channels through said fluid passages, said fluid passages being made to communicate with said first outer periphery where not already exposed and where necessary by removing a portion of said outer casting or a portion of said fluid passage member or both.

34. The method of making perforated mill roll body of claim 33 wherein said inner casting contains a plurality of open grooves extending generally between said axial ends on said second outer periphery of said inner casting and said fluid channels are formed in part by said open grooves and in part by said first inner periphery of said outer casting, said fluid passage members being disposed radially outwardly of said open grooves so that when said outer casting is sleeved upon said inner casting, said open grooves are convened into said fluid channels which are in communication with said first outer periphery of said outer casting through said radially extending fluid passages inside said fluid passage members.

35. The method of making perforated mill roll body of claims 33 wherein said first outer periphery of said outer casting further contains a plurality of circumferential grooves formed thereon.

36. The method of claim 1 wherein the step of forming said channel strings comprises the step of integrally casting a plurality of the fluid-passage-containing fluid passage members with the fluid-channel-containing fluid channel wall member.

37. The method of claim 1 wherein the step of forming the roll body casting comprises the step of casting a castable material around a plurality of core materials making up the fluid passages and fluid channels.

38. The method of claim 1 which further comprises the step of forming circumferential surface grooves either by casting or by removing a portion of said outer periphery of said roll body, by machining or other suitable means, or any combination thereof.

39. The method of claim 1 which further comprises the step of forming at least one intermediary shell to be sandwiched between said shaft and said roll body casting.

40. A method of making an insertless perforated mill roll body having a generally cylindrical first outer periphery and a hollow central bore to be sleeved upon a rotatable shaft, said method comprises the steps of:

(a) forming an inner roll body casting containing said hollow central bore, a second outer periphery, two axial ends and a plurality of fluid channels extending generally between said axial ends;

(b) forming a plurality of communicating means connecting said fluid channels with said second outer periphery;

(c) forming an outer roll body casting containing said first outer periphery and a plurality of fluid passage members, each of said fluid passage members contains at least one generally radially extending fluid passage by casting a castable material around said fluid passage members; and (d) Sleeving said outer roll body casting upon said inner roll body casting;

(e) removing a portion of said outer roll body casting or a portion of said fluid passage member or both where said fluid passages are not already exposed on said first outer periphery or where necessary to connect said fluid passages to said first outer periphery.

41. The method of claim 40 wherein the step of forming said inner roll body casting comprising the step of casting a castable material around a plurality of channel-shaped core materials.

42. The method of claim 40 wherein the step of forming said inner roll body casting comprising the step of casting a castable material around a plurality of channel wall members.

43. The method of claim 40 wherein each of said fluid channels comprises a groove on said second outer periphery of said inner roll body casting whereby said fluid channels are formed when said outer roll body casting is sleeved upon said inner roll body casting.

44. The method of claim 40 further comprises the step of forming circumferential surface grooves either by casting or by removing a portion of said first outer periphery of said outer roll body casting, by machining or other suitable means, or any combination thereof.

45. The method of claim 40 further comprises the step of forming an intermediary shell to be sandwiched-between said shaft and said inner roll body casting.

* * * * *